Nov. 11, 1930.  E. H. PECKINPAUGH  1,781,598
FISH LURE
Filed Sept. 9, 1929

INVENTOR
E.H. Peckinpaugh
BY
Siggers + Adams
ATTORNEYS

Patented Nov. 11, 1930

1,781,598

UNITED STATES PATENT OFFICE

ERNEST H. PECKINPAUGH, OF CHATTANOOGA, TENNESSEE

FISH LURE

Application filed September 9, 1929. Serial No. 391,337.

This invention relates to fish hooks and fish lures and, among other objects, aims to provide improved tandem hooks and artificial flies or lures connected thereto. One of the main ideas is to provide an improved connection between a front and rear hook so constructed and arranged that the rear hook may be directly connected to the front hook without any separate connecting means. Other aims and advantages of the invention will appear in the description considered in connection with the accompanying drawing showing one illustrative embodiment thereof, and in which.

Figure 2:
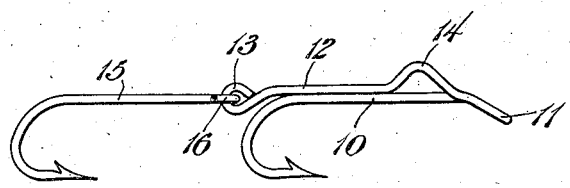
Fig. 2 is a side elevation of the hooks alone.
Figure 3:
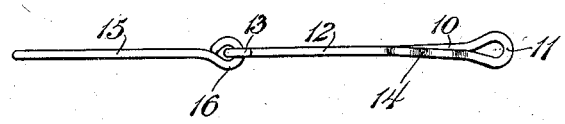
Fig. 3 is a top edge view of the hooks shown in Fig. 2.

Referring now more particularly to the drawing and to the illustrated tandem hooks shown in Figs. 2 and 3, it will be seen that the front hook 10 has its shank reversely bent to provide a loop or eye 11 and a depending, reversely bent shank portion 12 which terminates in an attaching eye 13 adjacent to the rear end of the hook. In this instance, a hump 14 is provided on the reversely bent shank portion to facilitate the attachment of the head or body portion of artificial flies or lures. This hump may be and preferably is similar to that shown on the main shank of the hook in my application, Ser. No. 316,013, filed Oct. 30, 1924.

A rear hook 15 is shown as having its eye 16 attached to or connected to the eye 13 on the shank extension 12 of the front hook. The point of the rear hook may be attached with the point up or down as viewed in Figs. 1 and 2. Referring to Fig. 3, it will be seen that the reversely bent shank portion 12 and the eye 13 lie in the same plane as the front hook so that it is capable of swinging freely in a vertical plane as the lure is drawn through the water and bobs up and down. Moreover, when the lure is pulled through the water, the rear hook will not swing laterally and catch in the tackle or the front hook.

Figure 1:
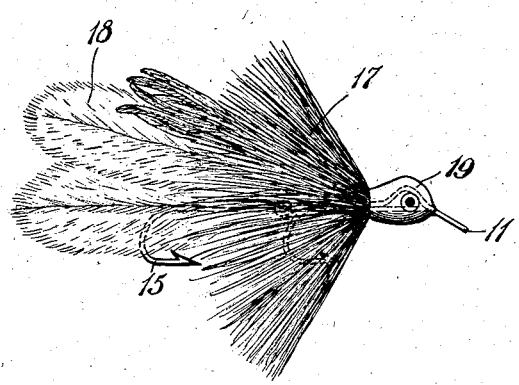
Fig. 1 is a side elevation of the preferred form of tandem hooks having an artificial lure attached thereto.

In Figs. 1 and 2, the eye portion 11 of the front hook is shown as being bent at a slight angle to the shank so as to simulate the bill of an artificial fly or insect. Also, by bending the eye portion, a point for attaching the line or leader is provided that is out of line with the shank of the front hook which causes an erratic movement of the lure when drawn through the water. Such erratic movement is very attractive to game fish.

In this instance, a tuft of hair and feathers 17 and feathers 18 are secured to the shank of the front hook and head 19 is applied to the hump portion 14 of the reversely bent connecting arm 12. This artificial fly may be somewhat similar to that shown and described in my Patent, No. 1,557,083. The idea being to conceal the barbs of both hooks and to simulate an appetizing insect or lure for use in game fishing. Tufts of hair or feathers may also be applied to the rear hook 15 if desired or an artificial fly may be substituted for the rear hook.

From the foregoing description, it will be seen that the application of the artificial fly to the double shank of the front hook prevents any possibility of spreading the hook or eye 11 and losing the hook. Also, when the tandem hooks are used for casting or trolling, the trailing hook is free to swing either downwardly or upwardly with respect to the front hook and will remain substantially in line with it while the lure is being pulled through the water. Further, the shape of the artificial fly head and eye are such as to cause the lure to dive or wiggle when pulled through the water. The described tandem hooks can be made very economically of two pieces of wire and are firmly secured together. In the manufacture of the hooks no special connecting link or tackle is required.

Obviously, the present invention is not restricted to the particular embodiment thereof herein shown and described.

What is claimed is:

1. Tandem fish hooks comprising a front hook having a reversely bent shank presenting an eye at the bend and extending rearwardly to a point near the rear of the hook; an eye formed on the end of the reversely bent portion and lying in the same plane as the front hook; and a rear hook having an eye connected to said eye on the rear end of the reversely bent portion.

2. Tandem fish hooks comprising a front hook having a reversely bent shank providing an eye at the bend; an eye on the rear end of the reversely bent portion; and a second hook connected to said last mentioned eye and projecting below the front hook.

3. Tandem fish hooks comprising, in combination, a front hook having a reversely bent shank presenting an eye at the front end; a hump on the reversely bent portion of the shank to enable an artificial fly head or body to be attached thereto; an eye on the rear end of the reversely bent portion; and a rear hook connected to said last named eye.

4. A fish lure of the character described comprising, in combination, a pair of fish hooks connected in tandem; one of said hooks having a reversely bent shank to which the other hook is connected, an artificial body or insect head connected to the shank and reversely bent portion of the front hook; and tufts of feathers carried by said head or hook shank.

In testimony, that I claim the foregoing as my own, I have hereto affixed my signature.

ERNEST H. PECKINPAUGH.